US012663299B2

(12) United States Patent
Aizawa et al.

(10) Patent No.: US 12,663,299 B2
(45) Date of Patent: Jun. 23, 2026

(54) NOISE LEVEL PREDICTION SYSTEM FOR VEHICLE

(71) Applicant: TOYOTA BOSHOKU KABUSHIKI KAISHA, Aichi (JP)

(72) Inventors: Kai Aizawa, Toyota (JP); Masahiro Nagano, Toyota (JP); Mitsutaka Sakoh, Nagakute (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 147 days.

(21) Appl. No.: 18/650,175

(22) Filed: Apr. 30, 2024

(65) Prior Publication Data

US 2024/0393152 A1 Nov. 28, 2024

(30) Foreign Application Priority Data

May 24, 2023 (JP) ................................. 2023-085611

(51) Int. Cl.
H04R 29/00 (2006.01)
G01D 21/00 (2006.01)
G06F 3/16 (2006.01)

(52) U.S. Cl.
CPC ............. G01D 21/00 (2013.01); G06F 3/165 (2013.01)

(58) Field of Classification Search
CPC .. G06F 3/165; G01D 21/00; G10K 11/17854; G10L 15/20

USPC ........................................................... 381/56
See application file for complete search history.

(56) References Cited

U.S. PATENT DOCUMENTS 8,023,666 B2 * 9/2011 Nakajima ............... G10L 15/20
381/56

FOREIGN PATENT DOCUMENTS

CN 111951775 A * 11/2020 ....... G10K 11/17854
JP 2017-40128 2/2017

* cited by examiner

*Primary Examiner* — Md S Elahee
(74) *Attorney, Agent, or Firm* — Greenblum & Bernstein, P.L.C.

(57) ABSTRACT

A noise level prediction system for a vehicle configured to predict a noise to be perceived by an occupant of the vehicle includes: a parameter determiner configured to determine at least three parameters as parameters relating to a noise reduction effect when the noise is transmitted to the occupant, the parameter determiner being configured to determine, as the at least three parameters, a parameter relating to a sound insulation ability, a parameter relating to a sound absorption ability, and a parameter relating to a distance attenuation characteristic; and a calculator configured to calculate and predict a level of the noise to be perceived by the occupant by using the at least three parameters relating to the noise reduction effect determined by the parameter determiner.

9 Claims, 5 Drawing Sheets

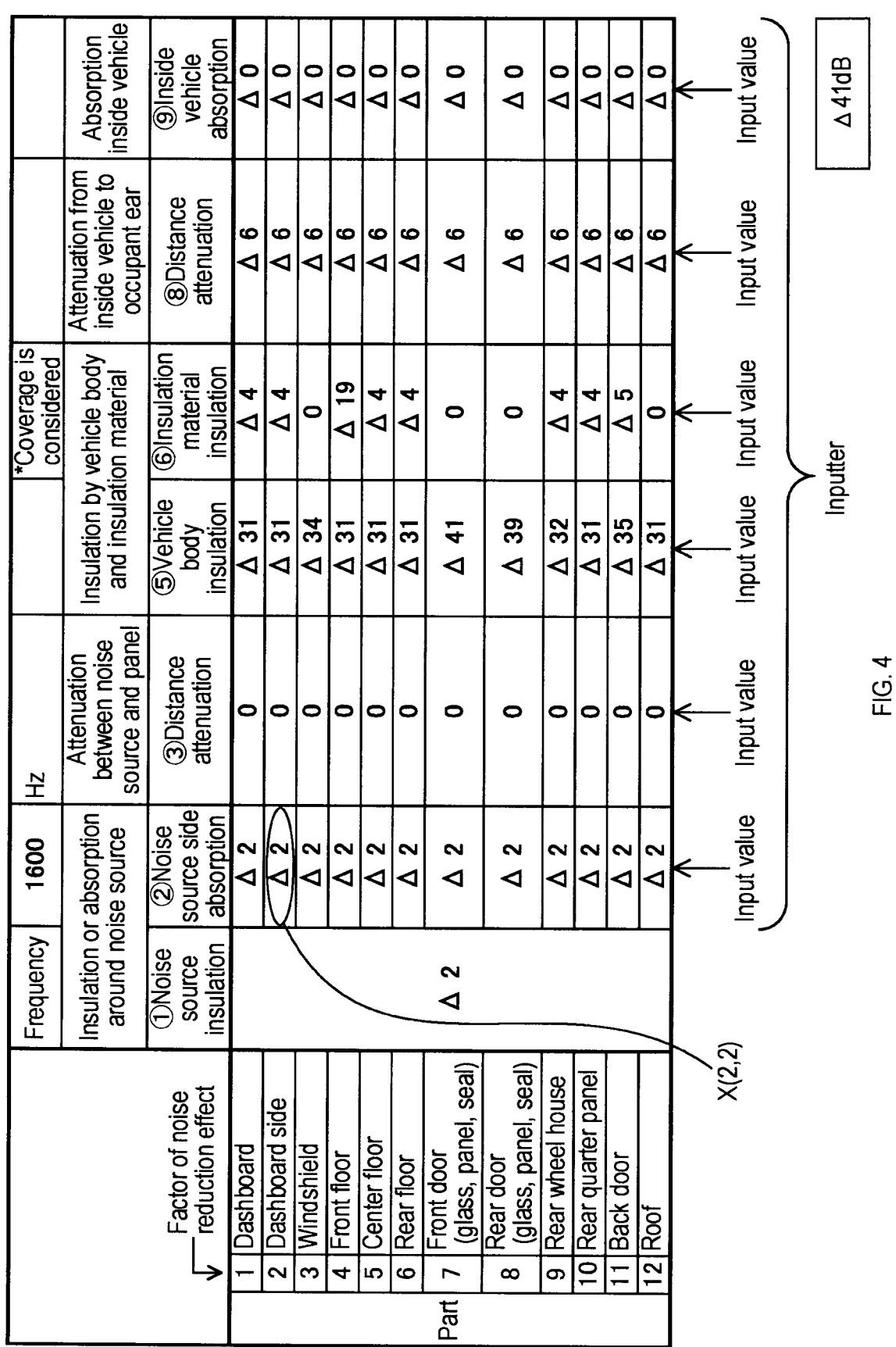

| | Factor of noise reduction effect | Frequency | 1600 | Hz | | | | | | |
|---|---|---|---|---|---|---|---|---|---|---|
| | | | Insulation or absorption around noise source | | Attenuation between noise source and panel | Insulation by vehicle body and insulation material | | Attenuation from inside vehicle to occupant ear | Absorption inside vehicle | |
| | | | ①Noise source insulation | ②Noise source side absorption | ③Distance attenuation | ⑤Vehicle body insulation | ⑥Insulation material insulation *Coverage is considered | ⑧Distance attenuation | ⑨Inside vehicle absorption | |
| 1 | Dashboard | | | △2 | 0 | △31 | △4 | △6 | △0 | |
| 2 | Dashboard side | | △2 | △2 | 0 | △31 | △4 | △6 | △0 | |
| 3 | Windshield | | | △2 | 0 | △34 | 0 | △6 | △0 | |
| 4 | Front floor | | | △2 | 0 | △31 | △19 | △6 | △0 | |
| 5 | Center floor | | | △2 | 0 | △31 | △4 | △6 | △0 | |
| 6 | Rear floor | | | △2 | 0 | △31 | △4 | △6 | △0 | |
| Part 7 | Front door (glass, panel, seal) | | | △2 | 0 | △41 | 0 | △6 | △0 | |
| 8 | Rear door (glass, panel, seal) | | | △2 | 0 | △39 | 0 | △6 | △0 | |
| 9 | Rear wheel house | | | △2 | 0 | △32 | △4 | △6 | △0 | |
| 10 | Rear quarter panel | | | △2 | 0 | △31 | △4 | △6 | △0 | |
| 11 | Back door | | | △2 | 0 | △35 | △5 | △6 | △0 | |
| 12 | Roof | | | △2 | 0 | △31 | 0 | △6 | △0 | |
| | | | Input value | Input value | Input value | Input value | Input value | Input value | Input value | |

X(2,2)

Inputter

| Part | | Panel area | ①Noise source insulation<br>Cover area weight | ②Noise source side absorption<br>Absorption capacity | ③Distance attenuation<br>Distance from noise source to panel | ⑤Vehicle body insulation<br>Partition mass | ⑥Insulation material insulation | | ⑧Distance attenuation<br>Distance from panel to occupant ear | ⑨Inside vehicle absorption<br>Absorption capacity |
|---|---|---|---|---|---|---|---|---|---|---|
| | | | | | | | General plane IL | Coverage of insulation material | | |
| 1 | Dashboard | 1.0 m2 | 1000 gsm | 1.2 | 0.5 m | 7800 gsm | Δ20 dB | 60 % | 1.5 m | 1 |
| 2 | Dashboard side | 1.0 m2 | Coverage | 1.2 | 0.5 m | 7800 gsm | Δ20 dB | 60 % | 1.5 m | 1 |
| 3 | Windshield | 1.0 m2 | 40 % | 1.2 | 0.5 m | 7800 gsm | 0 | 0 % | 1.5 m | 1 |
| 4 | Front floor | 1.0 m2 | | 1.2 | 0.5 m | 7800 gsm | Δ20 dB | 60 % | 1.5 m | 1 |
| 5 | Center floor | 1.0 m2 | General plane TL | 1.2 | 0.5 m | 7800 gsm | Δ20 dB | 60 % | 1.5 m | 1 |
| 6 | Rear floor | 1.0 m2 | 16.6 | 1.2 | 0.5 m | 7800 gsm | Δ20 dB | 60 % | 1.5 m | 1 |
| 7 | Front door (glass, panel, seal) | 1.0 m2 | | 1.2 | 0.5 m | 7800 gsm | 0 | 0 % | 1.5 m | 1 |
| 8 | Rear door (glass, panel, seal) | 1.0 m2 | | 1.2 | 0.5 m | 7800 gsm | 0 | 0 % | 1.5 m | 1 |
| 9 | Rear wheel house | 1.0 m2 | | 1.2 | 0.5 m | 7800 gsm | Δ20 dB | 60 % | 1.5 m | 1 |
| 10 | Rear quarter panel | 1.0 m2 | | 1.2 | 0.5 m | 7800 gsm | Δ20 dB | 60 % | 1.5 m | 1 |
| 11 | Back door | 1.0 m2 | | 1.2 | 0.5 m | 7800 gsm | 0 | 0 % | 1.5 m | 1 |
| 12 | Roof | 1.0 m2 | | 1.2 | 0.5 m | 7800 gsm | Δ20 dB | 0 % | 1.5 m | 1 |

Inputter

FIG. 5

NOISE LEVEL PREDICTION SYSTEM FOR VEHICLE

CROSS-REFERENCE TO RELATED APPLICATIONS

This application claims the benefit of Japanese Patent Application No. 2023-085611 filed on May 24, 2023 with the Japan Patent Office, the entire disclosure of which is incorporated herein by reference.

BACKGROUND

The present disclosure relates to a noise level prediction system for a vehicle configured to predict a noise to be perceived by an occupant of the vehicle.

For example, in the invention disclosed in Japanese Unexamined Patent Application Publication No. 2017-40128, a noise at a particular position is predicted by calculating an attenuation amount of the noise using a distance from a noise source to the particular position.

SUMMARY

The noise level prediction system described in Japanese Unexamined Patent Application Publication No. 2017-40128 is intended for use in designing a house. Thus, the system cannot be converted to a noise level prediction system for a vehicle as it is. In view of this, the present disclosure discloses an example of a noise level prediction system for a vehicle.

It is desirable that a noise level prediction system for a vehicle configured to predict a noise to be perceived by an occupant of the vehicle comprises at least one of elements below, for example.

Specifically, such elements are: a parameter determiner configured to determine at least three parameters as parameters relating to a noise reduction effect when the noise is transmitted to the occupant, the parameter determiner being configured to determine, as the at least three parameters, a parameter relating to a sound insulation ability, a parameter relating to a sound absorption ability, and a parameter relating to a distance attenuation characteristic; and a calculator configured to calculate and predict a level of the noise to be perceived by the occupant by using the at least three parameters relating to the noise reduction effect determined by the parameter determiner.

With this configuration, the noise level prediction system for a vehicle calculates and predicts the level of the noise to be perceived by the occupant, taking into account the sound absorption ability as well. Thus, the noise level prediction system suitable for a vehicle can be obtained.

In addition, the noise level prediction system for a vehicle may be configured as described below, for example.

Specifically, it is desirable that the noise level prediction system for a vehicle comprises an inputter configured to receive an input from a user, the inputter is configured to allow input therein of a numerical value directly indicating the noise reduction effect, and the parameter determiner is configured to determine the at least three parameters by using the numerical value input to the inputter.

Furthermore, it is desirable that the noise level prediction system for a vehicle comprises an inputter configured to receive an input from a user, the inputter is configured to allow input therein of a specification value required to determine the at least three parameters, and the parameter determiner is configured to determine the at least three parameters by using the specification value input to the inputter.

It is desirable that the noise level prediction system for a vehicle comprises a specification value inverse-calculator configured to, when the numerical value directly indicating the noise reduction effect is input to the inputter, calculate the specification value required to determine the at least three parameters by using the numerical value. This allows a user to easily obtain the specification value required to obtain the numerical value directly indicating the noise reduction effect.

It is desirable that the specification value comprises a mass, an area (including a surface area), or the like, and the noise level prediction system for a vehicle further comprises an automatic inputter configured to perform an automatic input while varying the numerical value to be input to the inputter within a range specified in advance. This allows a user to easily understand a relationship between the numerical value directly indicating the noise reduction effect and the mass.

It is desirable that the inputter is configured to allow input therein individually for each factor of the noise reduction effect that is present on a path from a noise source to a position of the occupant. This allows a user to understand a realistic noise level of an appropriate value.

BRIEF DESCRIPTION OF THE DRAWINGS

An example embodiment of the present disclosure will be described hereinafter with reference to the accompanying drawings, in which:

FIG. 4 is a diagram showing one example of an inputter; and

FIG. 5 is a diagram showing one example of the inputter.

DETAILED DESCRIPTION OF EXEMPLARY EMBODIMENTS

Embodiments of the invention below show examples of embodiments that fall within the technical scope of the present disclosure. In other words, matters to specify the invention and so on recited in the claims are not limited by any specific configuration, structure, and so on described in the embodiments below.

The present embodiment is one example in which a noise level prediction system for a vehicle of the present disclosure is applied to a noise level prediction system for a car and the like.

First Embodiment

Figure 1:
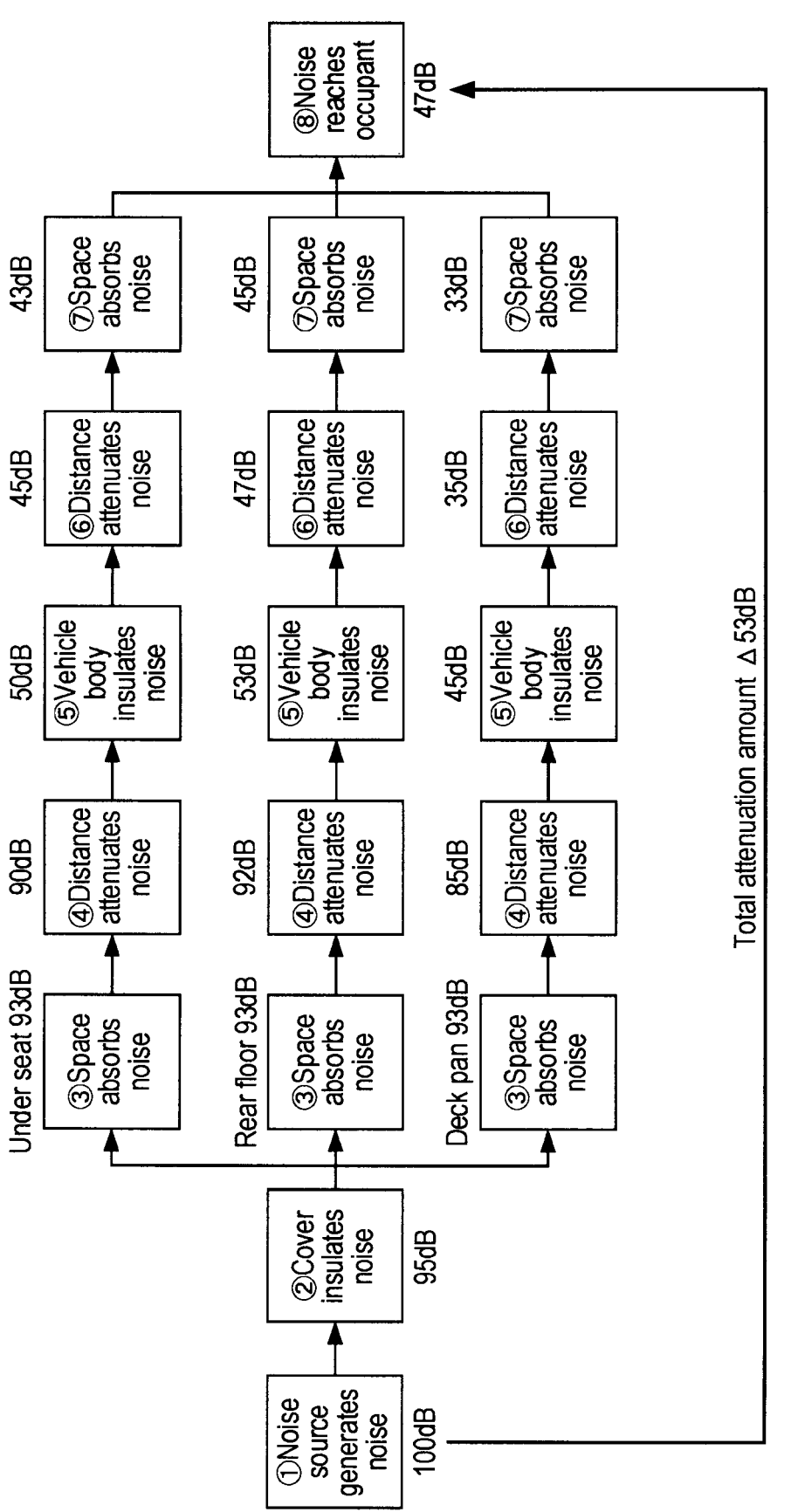
FIG. 1 is a diagram showing an overview of a noise level prediction system and a noise level prediction method.

1. Overview of Noise Level Prediction System and Noise Level Prediction Method For example, as shown in FIG. 1, a sound (including a vibration) perceived by an occupant of a car as a noise reaches the occupant via multiple paths from a noise source (such as an engine or an electric motor).

Multiple factors that attenuate or reduce the noise exist on the path of the noise (hereinafter referred to simply as a "path") from the noise source (hereinafter referred to also as a "sound source") to a seated position of the occupant. A parameter indicating a degree of effectiveness in attenuating or reducing the noise by the factor that attenuates or reduces the noise (hereinafter referred to as a "factor of a noise reduction effect") will be hereinafter referred to as an attenuation degree.

To predict a noise level in the vehicle properly, it is necessary to consider at least (i) an attenuation degree relating to a sound insulation ability, (ii) an attenuation degree relating to a sound absorption ability, and (iii) an attenuation degree relating to a distance attenuation characteristic for the reasons described below.

Specifically, it is because a body of a car (including interior components and exterior components, in particular, the interior components) is provided with members achieving a sound insulation function and members achieving a sound absorption function. In addition, as a distance from the sound source to the occupant increases, the level of the noise to be perceived by the occupant naturally decreases.

In this case, at least one factor of the noise reduction effect exists on each path. For example, when an influence (hereinafter referred to as an "attenuation amount X") due to an attenuation degree "j" existing on a path "i" is expressed as $X(i, j)$, an attenuation amount $f(\Sigma x)$ at the seated position corresponds to a function value of a total sum of $X(i, j)$.

In this context, "i" indicates a type of the path. "j" indicates the attenuation amount due to the factor that attenuates or reduces the noise, that is, the factor of at least one of the attenuation degree due to the sound insulation ability, the attenuation degree due to the sound absorption ability, and the attenuation degree due to the distance attenuation characteristic. For example, in FIG. 4, the attenuation degree $X(2,2)$ means the attenuation degree X due to the sound absorption ability on a path 2.

Thus, if the attenuation amounts $X(i, j)$ that correspond to the types of the paths "i" and one or more factors of the noise reduction effect on each of the paths are found, then the attenuation amount $f(\Sigma x)$ at the seated position, in other words, the noise level at the seated position, can be predicted.

Figure 2:
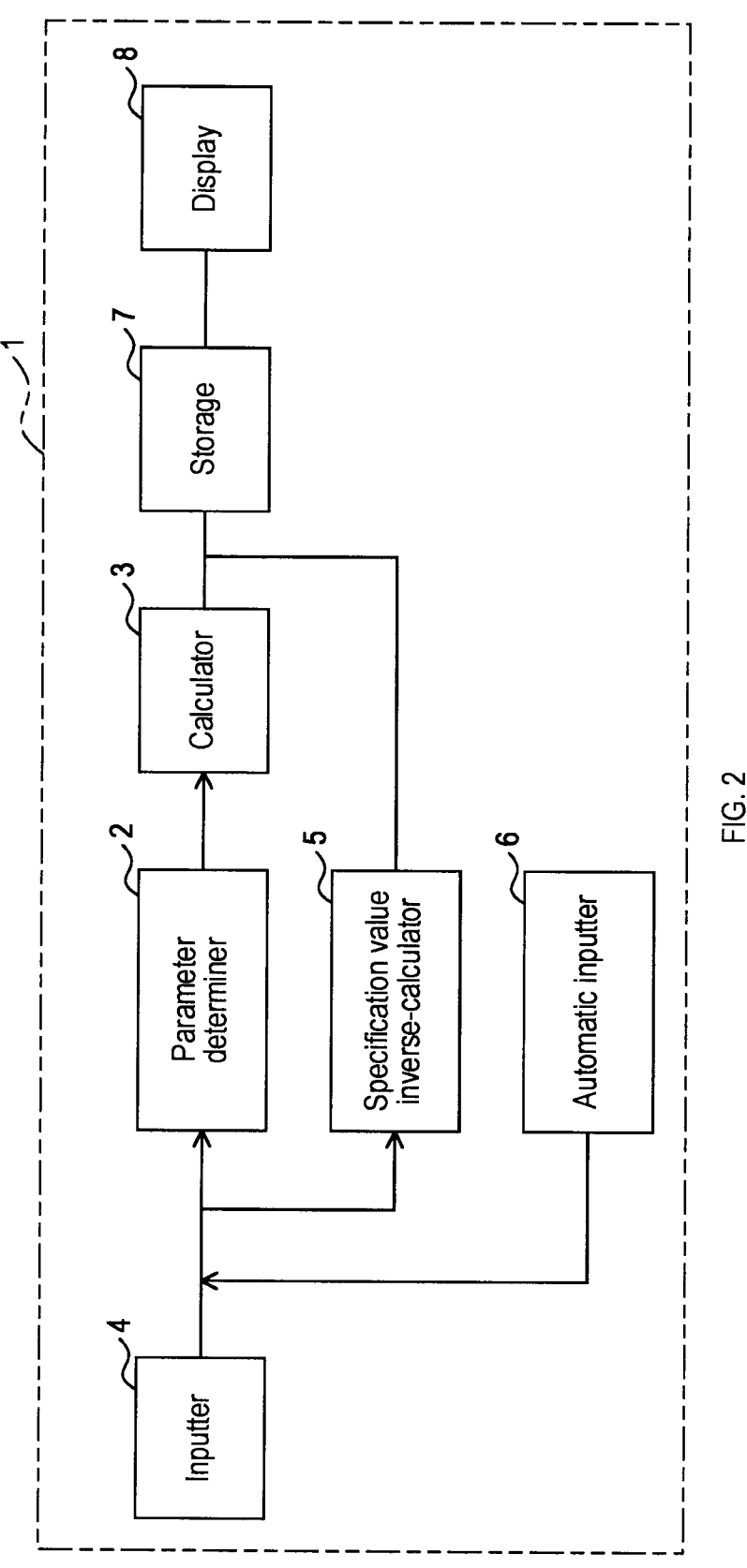
FIG. 2 is a diagram showing the noise level prediction system.

2. Configuration of Noise Level Prediction System
(see FIG. 2)

A noise level prediction system 1 comprises at least a parameter determiner 2, a calculator 3, an inputter 4, a specification value inverse-calculator 5, an automatic inputter 6, a storage 7, and a display 8. In the present embodiment, the parameter determiner 2, the calculator 3, the inputter 4, the specification value inverse-calculator 5, and the automatic inputter 6 are realized by running a software (a program) on a computer. The software is stored in advance in a non-volatile storage such as a ROM.

The computer includes a CPU, a ROM, a RAM, and so on and is operated by running the software and an operating system on the CPU. The storage 7 is configured with a non-volatile storage such as a magnetic storage, for example. The display 8 allows a user of a display, a printer, or the like to view information on the display.

<Parameter Determiner>

The parameter determiner 2 determines parameters relating to the noise reduction effect when the noise is transmitted to the occupant (namely, the attenuation degrees) by using input values input to the inputter 4. Specifically, the parameter determiner 2 determines (i) the attenuation degree relating to the sound insulation ability, (ii) the attenuation degree relating to the sound absorption ability, and (iii) the attenuation degree relating to the distance attenuation characteristic.

<Calculator>

The calculator 3 calculates and predicts the level of the noise to be perceived by the occupant by using the attenuation degrees relating to the noise reduction effect determined by the parameter determiner 2. Specifically, the calculator 3 calculates the attenuation amounts $X(i, j)$ based on the attenuation degrees, and then calculates the attenuation amount $f(\Sigma x)$ as a function value of the total sum of the attenuation amounts $X(i, j)$. The function to obtain the attenuation amount $f(\Sigma x)$ from the total sum of $X(i, j)$ is determined in advance by tests, numerical simulations using a computer, or the like.

<Inputter>

The inputter 4 receives an input from a user. The inputter 4 can accept input of numerical values directly indicating the noise reduction effect (for example, the attenuation amounts X) and specification values required to determine the attenuation degrees or the attenuation amounts.

Among specifications of a member that can serve as a factor in attenuating or reducing the noise (for example, a panel separating the seated position from the sound source), the specification value means a specification that contributes to the attenuation or reduction of the noise (for example, a mass of the panel).

When the specification values are input to the inputter 4, the parameter determiner 2 calculates the numerical values directly indicating the noise reduction effect (that is, the attenuation amounts X) based on the specification values.

The parameter determiner 2 according to the present embodiment calculates the numerical values (namely, the attenuation amounts X) directly indicating the noise reduction effect as function values of the specification values. A function to calculate the attenuation amounts X (hereinafter referred to as a "specification function") is determined in advance by tests, numerical simulations using a computer, or the like.

<Specification Value Inverse-Calculator>

The specification value inverse-calculator 5 calculates, when the attenuation amounts X are input to the inputter 4, the specification values (such as a mass) required to determine the parameters by using the attenuation amounts X. In other words, the specification value inverse-calculator 5 calculates the specification values from the attenuation amounts X by using an inverse function of the specification function.

<Automatic Inputter>

The automatic inputter 6 performs an automatic input while varying the numerical values to be input to the inputter 4 (for example, the attenuation amounts X) within ranges specified in advance. Then, the automatic input of the attenuation amounts X by the automatic inputter 6 causes the specification value inverse-calculator 5 to be activated. This results in an automatic calculation of the specification values corresponding to respective numerous attenuation amounts X.

Figure 3:
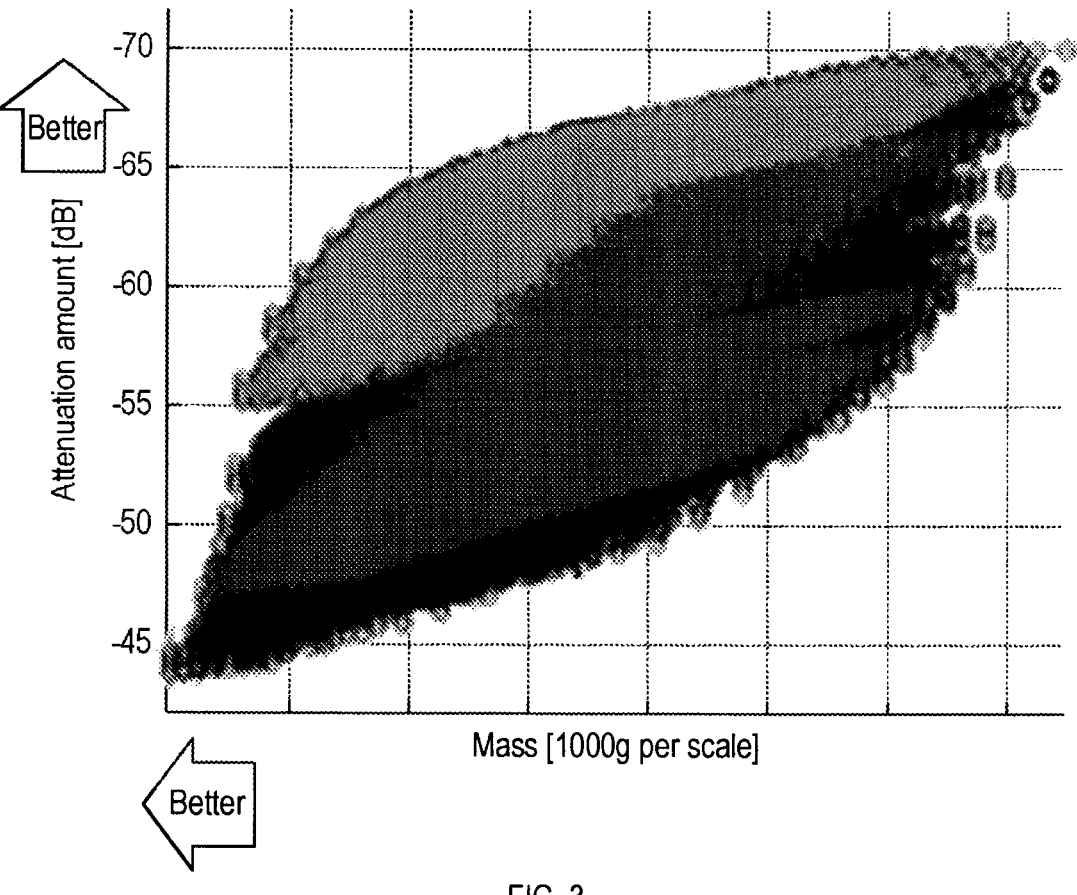
FIG. 3 is a chart showing a correspondence relationship between an attenuation amount X and a specification value.

The automatically-calculated attenuation amounts X and specification values are recorded in the storage 7. Then, in response to a display instruction from the user to the noise level prediction system 1, the display 8 displays a chart showing a relationship between the attenuation amount X and the specification value as shown in FIG. 3.

3. Working Examples of Noise Level Prediction System

FIG. 4 shows an example of a case where the inputter 4 and the attenuation amount $f(\Sigma x)$ are displayed on the display 8. In FIG. 4, the attenuation amounts X (shown as Δ31, Δ2, and the like) are input as the numerical values to be input to the inputter 4. In the present description and the accompanying drawings, Δ indicates a change in sound attenuation amounts.

FIG. 5 shows an example of a case where the inputter 4 for the specification values is displayed on the display 8. Specifically, in FIG. 5, an area or a mass of each part is input for each part of multiple points as the numerical values to be input to the inputter 4. In this way, when the specification values are input to the inputter 4, the attenuation amounts X are automatically calculated based on the specification values and then the attenuation amount f(Σx) is calculated, as described above.

The inputter 4 of FIGS. 4 and 5 is configured to allow input therein individually for each factor of the noise reduction effect that is present on a path from the noise source to the position of the occupant. In other words, the inputter 4 is configured to allow input therein of the attenuation amount X individually for each part of multiple points.

4. Characteristics of Noise Level Prediction System for Vehicle of Present Embodiment The noise level prediction system 1 of the present embodiment calculates and predicts the level of the noise to be perceived by the occupant, taking into account the sound absorption ability as well. The noise level prediction system suitable for a vehicle can be obtained.

Thus, it is possible to easily predict, by calculation, a noise reduction performance throughout the car faster than a case of performing a detailed 3D-CAE calculation. Accordingly, it is possible to propose a structure implementing noise reduction measures, even in an initial phase of a project with no design drawings, namely, even in a stage with no data required for 3D-CAE.

The noise level prediction system 1 makes it possible to predict the noise reduction effect based on the specification values, so that effective noise reduction measures can be taken by associating the noise reduction effect with other information such as mass and cost in a development or study.

The noise level prediction system 1 quantifies a performance corresponding to an intermediate characteristic of a component constituting a factor of the noise reduction and the like. Thus, for example, in case of considering a change in a cross-sectional configuration of a component as measures against heat, a policy for the noise reduction measures and the measures against heat can be clearly established while considering a change in the noise reduction performance and the measures against heat.

The noise level prediction system 1 comprises the specification value inverse-calculator 5 that, when the numerical values directly indicating the noise reduction effect are input to the inputter 4, calculates the specification values required to determine the attenuation amounts X by using the numerical values. This allows a user to easily obtain the specification values required to obtain the numerical values directly indicating the noise reduction effect.

The noise level prediction system 1 comprises the automatic inputter 6 that performs the automatic input while varying the numerical values to be input to the inputter 4 within the ranges specified in advance. This allows a user to easily understand a relationship between the numerical value directly indicating the noise reduction effect and the mass, as shown in FIG. 3.

As shown in FIGS. 4 and 5, the inputter 4 of the noise level prediction system 1 allows input therein individually for each factor of the noise reduction effect that is present on the path from the noise source to the position of the occupant. This allows the user to understand a realistic noise level of an appropriate value.

OTHER EMBODIMENTS

In the aforementioned embodiment, the noise level prediction system for a vehicle has been described using the car as an example of the vehicle. However, the present disclosure is not limited thereto. Specifically, the present disclosure may be applied to vehicles other than the car, for example.

In the aforementioned embodiment, the mass or the area has been used as the specification value. However, the present disclosure is not limited thereto. Specifically, the present disclosure may include a noise level prediction system using a numerical value other than the mass as the specification value, for example.

In the automatic inputter 6 according to the aforementioned embodiment, the attenuation amount X is used as an example of the numerical value to be input to the inputter 4. However, the present disclosure is not limited thereto. Specifically, the present disclosure may be configured to vary numerous specification values, such as the masses or the areas, within specified ranges, and then calculate corresponding numerous parameters (for example, the attenuation degrees due to the sound insulation ability, the sound absorption ability, and the distance attenuation characteristic), and finally calculate corresponding attenuation amounts.

Moreover, the present disclosure only needs to be consistent with the spirit of the disclosure described in the aforementioned embodiments, and is not limited by the above-described embodiments. Accordingly, the present disclosure may take a configuration in which at least two embodiments among the above-described embodiments are combined together, or a configuration in which any of the constituent elements shown in the drawings or the constituent elements described with reference numerals in the above-described embodiments is eliminated.

What is claimed is:

1. A noise level prediction system for a vehicle for predicting a noise to be perceived by an occupant of the vehicle, the noise level prediction system comprising:
   a memory that stores instructions;
   a processor, when executing the instructions stored in the memory, that performs operations including:
   determining at least three parameters as parameters relating to a noise reduction effect when the noise is transmitted to the occupant, the at least three parameters including a parameter relating to a sound insulation ability, a parameter relating to a sound absorption ability, and a parameter relating to a distance attenuation characteristic; and
   calculating and predicting a level of the noise to be perceived by the occupant by using the at least three parameters relating to the noise reduction effect.

2. The noise level prediction system for a vehicle according to claim 1, wherein the processor further performs operations including:
   receiving an input from a user,
   wherein the processor receives the input of a numerical value indicating the noise reduction effect, and
   wherein the processor determines the at least three parameters by using the numerical value.

3. The noise level prediction system for a vehicle according to claim 1, wherein the processor further performs operations including:

receiving an input from a user, wherein the processor receives the input of a specification value required to determine the at least three parameters, and wherein the processor determines the at least three parameters by using the specification value.

4. The noise level prediction system for a vehicle according to claim 2, wherein the processor further performs operations including:

calculating, when the input of the numerical value indicating the noise reduction effect is received, a specification value required to determine the at least three parameters by using the numerical value.

5. The noise level prediction system for a vehicle according to claim 4, wherein the specification value comprises a mass or an area, the processor further performs operations including:

performing an automatic input of the numerical value while varying the numerical value within a range specified in advance.

6. The noise level prediction system for a vehicle according to claim 2, wherein the processor receives the input individually for each factor of the noise reduction effect that is present on a path from a noise source to a position of the occupant.

7. The noise level prediction system for a vehicle according to claim 3, wherein the processor receives the input individually for each factor of the noise reduction effect that is present on a path from a noise source to a position of the occupant.

8. A non-transitory computer-readable storage medium storing a program that enables a computer to function as a noise level prediction system for a vehicle for predicting a noise to be perceived by an occupant of the vehicle, wherein the program enables the computer to perform:

determining at least three parameters as parameters relating to a noise reduction effect when the noise is transmitted to the occupant, the at least three parameters including a parameter relating to a sound insulation ability, a parameter relating to a sound absorption ability, and a parameter relating to a distance attenuation characteristic; and calculating and predicting a level of the noise to be perceived by the occupant by using the at least three parameter relating to the noise reduction effect.

9. A noise level prediction method for a vehicle for predicting a noise to be perceived by an occupant of the vehicle, the noise level prediction method comprising:

determining at least three parameters as parameters relating to a noise reduction effect when the noise is transmitted to the occupant, the at least three parameters being a parameter relating to a sound insulation ability, a parameter relating to a sound absorption ability, and a parameter relating to a distance attenuation characteristic; and calculating and predicting a level of the noise to be perceived by the occupant by using the determined at least three parameters relating to the noise reduction effect.

* * * * *